United States Patent [19]

Pettus

[11] Patent Number: 5,548,726

[45] Date of Patent: Aug. 20, 1996

[54] SYSTEM FOR ACTIVATING NEW SERVICE IN CLIENT SERVER NETWORK BY RECONFIGURING THE MULTILAYER NETWORK PROTOCOL STACK DYNAMICALLY WITHIN THE SERVER NODE

[75] Inventor: Christopher E. Pettus, San Francisco, Calif.

[73] Assignee: Taligeni, Inc., Cupertino, Calif.

[21] Appl. No.: 169,867

[22] Filed: Dec. 17, 1993

[51] Int. Cl.$^6$ .................................................. G06F 13/00
[52] U.S. Cl. .................. 395/200.09; 395/600; 395/650; 364/222.2; 364/284.4; 364/940.71; 364/DIG. 1
[58] Field of Search .................................... 395/600, 650, 395/700, 200.09, 200.16

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,257,369 | 10/1993 | Skeen et al. | 395/650 |
| 5,307,490 | 4/1994 | Davidson et al. | 395/650 |
| 5,396,630 | 3/1995 | Banda et al. | 395/700 |
| 5,408,619 | 4/1995 | Oran | 395/280 |
| 5,440,744 | 8/1995 | Jacobson et al. | 395/600 |

OTHER PUBLICATIONS

Communications of the Association for Computing Machinery., V.35(7), Jul. 1992, New York, US, pp. 77–98, A. Sinha "Client–Server Computing".

Computer Communication Review, V.21(4), Sep. 1991, New York, US, pp. 197–205, X. Tschudin "Flexible Protocol Stacks".

Primary Examiner—Thomas C. Lee
Assistant Examiner—Moustafa Mohamed Meky

[57] ABSTRACT

On a multi-node client server network, a client node obtains access to remote services by means of a communications directory service located in each node of the network. The communications directory service includes a tree structure to which existing directory services and other network services can be added. The tree structure has a plurality of nodes each of which includes specific methods that query and browse the associated directory service if such actions are supported by the underlying service. The communications directory service further includes shared libraries which store a service object associated with each service offered on the network. The service object, in turn, includes the service exchange address and communication link configuration information. A client desiring to access a remote service retrieves the appropriate service object from the communications directory service and uses the service object to set up the communications path.

19 Claims, 12 Drawing Sheets

SYSTEM FOR ACTIVATING NEW SERVICE IN CLIENT SERVER NETWORK BY RECONFIGURING THE MULTILAYER NETWORK PROTOCOL STACK DYNAMICALLY WITHIN THE SERVER NODE

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office. All other rights are expressly reserved.

FIELD OF THE INVENTION

This invention relates, in general, to distributed computer networks and more specifically to rule-based protocol processing for distributed network directory and naming services.

BACKGROUND OF THE INVENTION

With the tremendous growth of data processing by means of independent, localized data processing devices, such as personal computers and mini computers, data networks have evolved to connect together physically-separated devices and to permit digital communication among the various devices connected to the network.

There are several types of networks, including local area networks (LANs) and wide area networks (WANs). A LAN is a limited area network and data devices connected to a LAN are generally located within the same building. The LAN typically consists of a transmission medium, such as a coaxial cable or a twisted pair which connects together various computers, servers, printers, modems and other digital devices. Each of the devices, which are collectively referred to as "nodes", is connected to the transmission medium at an address which uniquely identifies the node and is used to route data from one node to another. A node which provides resources and services is called a "server" node and a node which uses the resources and services is called a "client" node. A WAN generally encompasses a much larger area and may involve common carrier connections such as telephone lines.

LANs and WANs are often connected together in various configurations to form "enterprise" networks which may span different buildings or locations or extend across an entire continent. Enterprise networks are convenient for several reasons: they allow resource sharing—programs, data and equipment are available to all nodes connected to the network without regard to the physical location of the resource and the user. Enterprise networks may also provide reliability by making several redundant sources of data available. For example, important data files can be replicated on several storage devices so that, if one of the files is unavailable, for example, due to equipment failure, the duplicate files are available.

One of the most important characteristics of enterprise networks is that they have the capability of bringing a large and sophisticated set of services to all of the attached users for a reasonable cost. However, for the users to exploit the network potential, they must be able to identify, locate and access the network resources. When a network is small, locating and accessing the available services is relatively simple, but networks are growing larger and there are many networks that presently very large. Thousand node networks are common and million node networks are on the horizon.

An example of a very large network is the INTERNET network, which is used by some of the largest public and private organizations. Much of the power of this type of network goes unused simply because the users are either unaware of the facilities available to them or they find the methods of accessing the facilities difficult or confusing. Consequently, in order to assist users in locating and accessing network resources, many existing networks today utilize network directory or naming services which accept a resource identifier or name from a user and locate the network address that corresponds to the desired network resource.

For example, the entered identifier or name can be "descriptive" and specify a resource by describing enough of its attributes to distinguish it from other resources. Such descriptive names are most useful to human users who are searching the network for a resource that meets certain specified criteria, but they are also require the most computing resources and are often difficult to distribute effectively. There presently exist a number standards for such descriptive name services. For example, the Consultative Committee on International Telephony and Telegraphy (CCITT) and the International Standards Organization (ISO) have developed a standard for a descriptive name service known as X.500.

Naming and directory services (these will be referred to together as "directory services" hereafter) are presently implemented in a variety of ways. The simplest implementation is to use a single, centralized database contained in a local server node to hold a list of names and corresponding network addresses. An example of such a localized directory service is shown in FIG. 1. FIG. 1 illustrates a computer network arranged in a "client-server" configuration comprising a plurality of client nodes 106, 108, 120, 122 and 128 which may, for example, be workstations, personal computers, minicomputers or other computing devices on which run application programs that communicate over various network links including links 102, 110, 116, 126 and 136 with each other and with server nodes, such as nodes 100, 112, 124, 132 and 138. The server nodes may contain specialized hardware devices and software programs that can provide a service or set of services to all or some of the client nodes. The client nodes are the users of the various network services which, in turn, are provided by the server nodes.

Typically, the centralized directory service database 104 is located in one of the server nodes, such as node 100. A client node, such as client node 108, can access the directory service by connecting to server node 100, entering a resource identifier or name and retrieving the network address of the associated service. By means of conventional database techniques, a client node may be able to search over the database in order to locate a given resource. In addition, many directory services support browsing by using partial name descriptions, "wild cards" and placeholders. Such centralized directory services with single databases work well in small networks where the number of network addresses is small. However, in larger networks, it is often not feasible to store all the resource identifiers in one central location. Further, a single database represents a single point of failure which can disable the entire network. In addition, a centralized database often suffers from poor performance. For example, while it may be relatively efficient for a local client, such as client 108, to connect to server 100 and access database 104, a remote client, such as client 120, which must link through several servers, 124 and 112, along with a "gateway" link 116, will incur a significant amount of network overhead and the overall system "cost" of the access will be high. With a large number of remote access attempts, directory service provider 100 can quickly become both a processing and communication bottleneck for the entire network.

In order to overcome these problems, additional prior art techniques have been developed which distribute the database data over multiple locations. Such a system is shown schematically in FIG. 2. FIG. 2 depicts a client-server type of network which is similar to that shown in FIG. 1. In particular, elements which correspond in the two figures have corresponding numeral designations. For example, client 108 in FIG. 1 is similar to client 208 in FIG. 2. The difference between the two networks is that the directory service database has been replicated in a number of the server nodes. For example, server node 200 contains a directory service database 204 as do server nodes 212 (database 214), server node 232 (database 230) and server node 224 (database 218). There are a number of prior art methods for replicating the data in each of the databases. Some systems replicate each resource identifier individually in each database, other systems replicate the entire database. Still other systems replicate individual nodes or limit replication by partitioning the database in some manner.

The distributed system shown in FIG. 2 avoids the problems associated with the centralized database. Since the data is replicated, there is no single point of failure and, since the data is usually available on a nearby server node, there are no "remote" client nodes and network overhead is greatly reduced.

However, the distributed system has its own problems. For example, some method must be used to insure data consistency if multiple sources can update the databases. Some systems force data consistency by keeping all copies of the data tightly synchronized in a manner similar to a conventional database system. Other system insure data integrity by means of conventional concurrency arbitration schemes.

Such distributed naming and directory services are effective on homogeneous networks in which the same access methods and protocols apply over the entire network. In this case, a consistent set of names and rules can be developed to permit location and access of various resources with relative ease. However, many large networks are heterogeneous—not only do the networks comprise many types of different computers, including work stations, personal computers, mini-computers, super-computers and main frames, but the network itself is often composed of many independent smaller networks which are connected together by interfaces called "gateways". These smaller networks may have their own access methods and protocols. Further, the heterogeneous construction and organization of these large networks does not lend itself to central control and management which could dictate common methods and protocols.

In many large networks which are comprised of a set of smaller networks which are connected together, each of the underlying separate networks may have its own different directory service utilizing a specific protocol. In this type of network a user may have to be familiar with each network directory service protocol and may have to shift from protocol to protocol as searches are performed from network to network. Consequently, in such a heterogeneous network, one of the main difficulties in accessing network resources arises from a lack of a consistent globally-accessible directory of network resources which can operate over heterogeneous networks without involving the user in the details and the protocol involved in accessing each of these separate networks.

Today's networking services have various protocol systems. In the prior art, applications must contain detailed information pertaining to protocol architectures for networking. This requirement mandated application ties to particular protocols. This prevented dynamic configuration of networks because applications could not support protocol changes without a source code change.

Accordingly, it is an object of the present invention to allow applications to specify a type and quality of service.

SUMMARY OF THE INVENTION

The foregoing problems are solved and the foregoing objects are achieved in one illustrative embodiment of the invention in which a rule based protocol selection mechanism selects the appropriate protocol configuration based on the type and quality of service. For each protocol family, a set of rules is defined to translate the type and quality of service into a particular set of common protocols.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENTS

Figure 3:
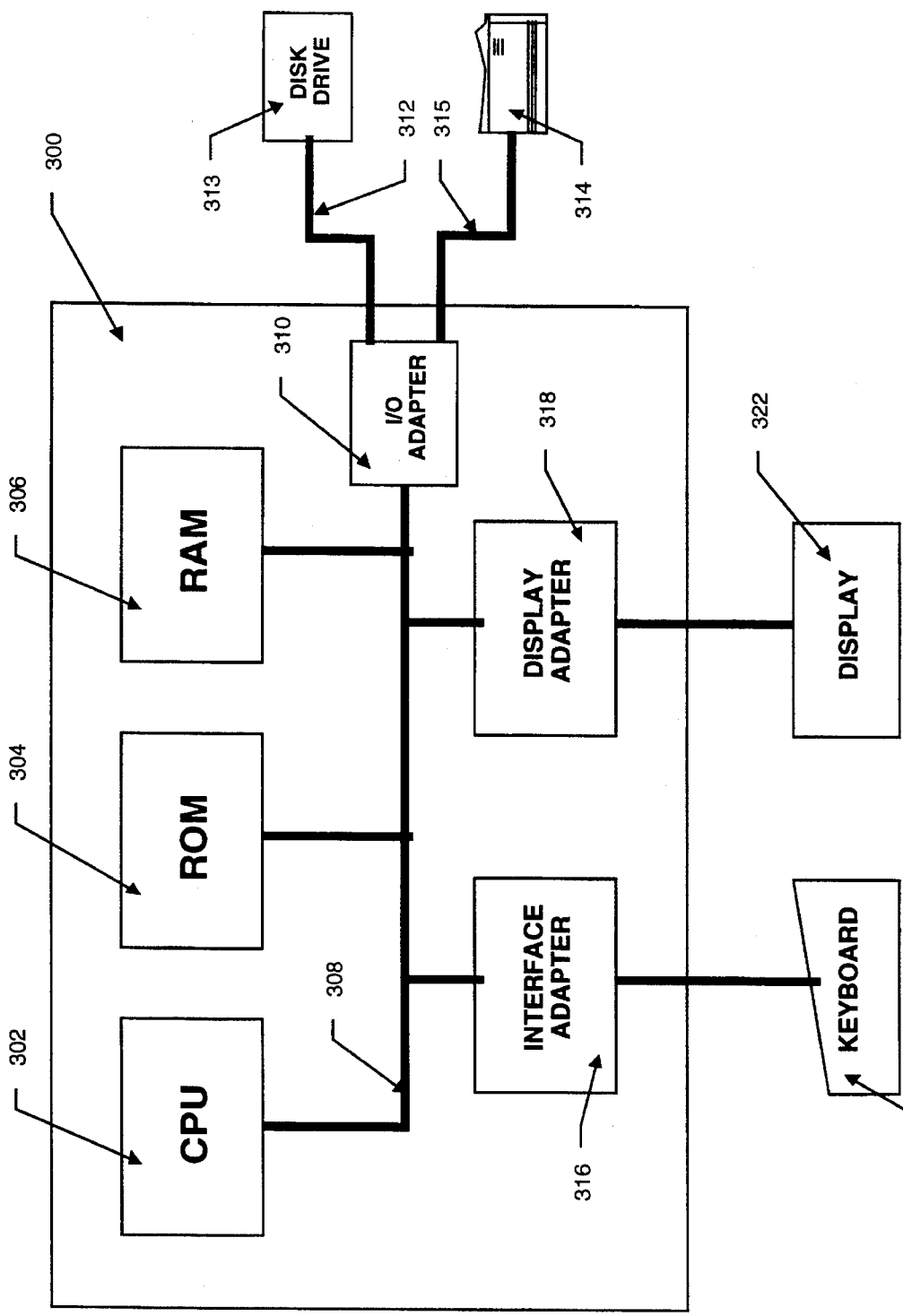
FIG. 3 is a block schematic diagram of a computer system, for example, a personal computer system in which the inventive object oriented printing interface operates.

The invention is preferably practiced in the context of an operating system resident on a personal computer such as the IBM™ PS/2™ or Apple™ Macintosh™ computer. A representative hardware environment is depicted in FIG. 3, which illustrates a typical hardware configuration of a computer 300 in accordance with the subject invention. The computer 300 is controlled by a central processing unit 302, which may be a conventional microprocessor; a number of other units, all interconnected via a system bus 308, are provided to accomplish specific tasks. Although a particular computer may only have some of the units illustrated in FIG. 3 or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322 such as a video monitor. The workstation has resident thereon and is controlled and coordinated by operating system software such as the Apple System/7™ operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a printing framework which could provide the foundation for automated pagination, pre-print processing and page composition of printable information generated by an application program. An application software developer who needed these capabilities would ordinarily have to write specific routines to provide them. To do this with a framework, the developer only needs to supply the characteristics and behavior of the finished output, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 1:
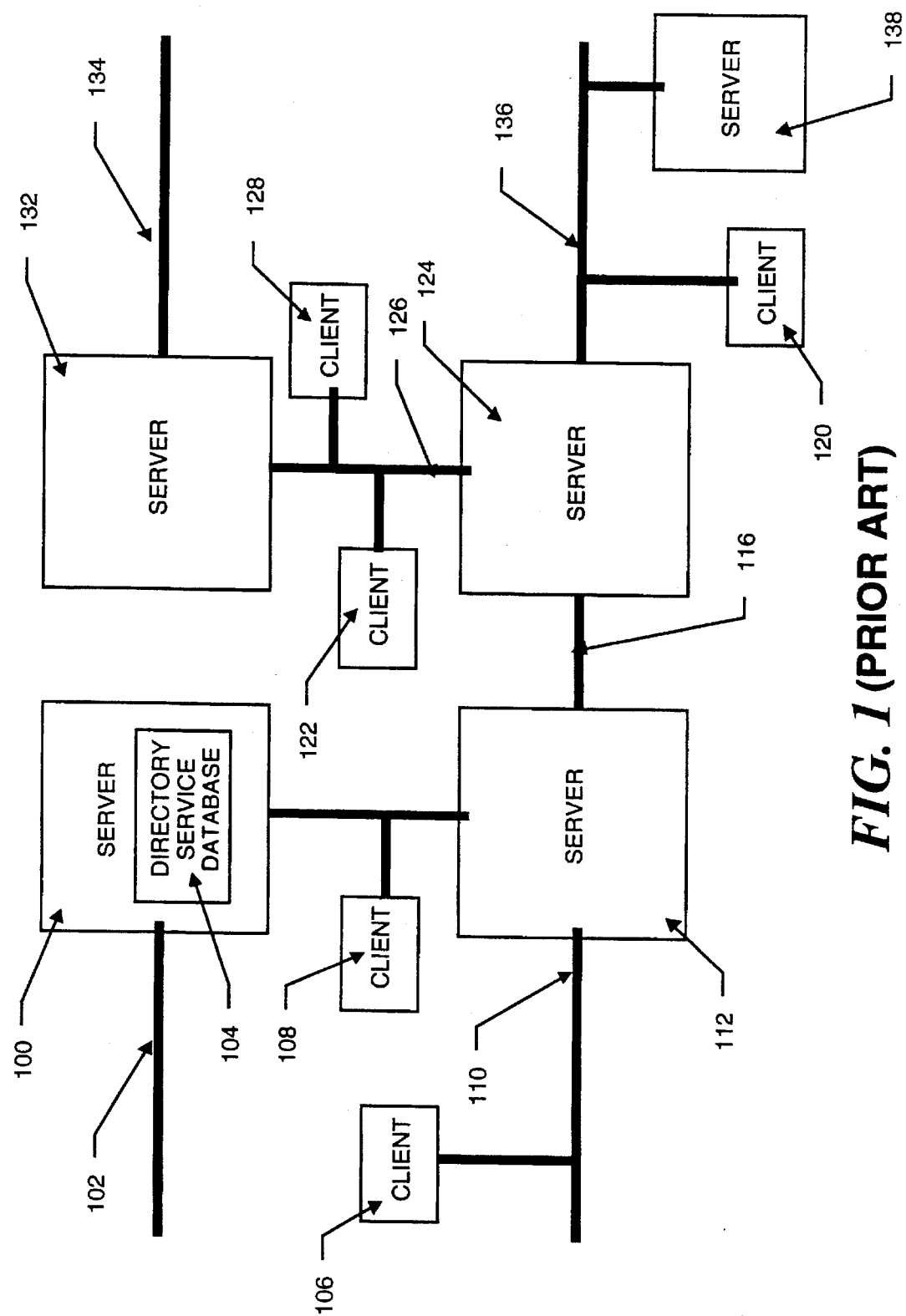
FIG. 1 is a block schematic diagram of a prior art client server network which incorporates a local directory service.
Figure 2:
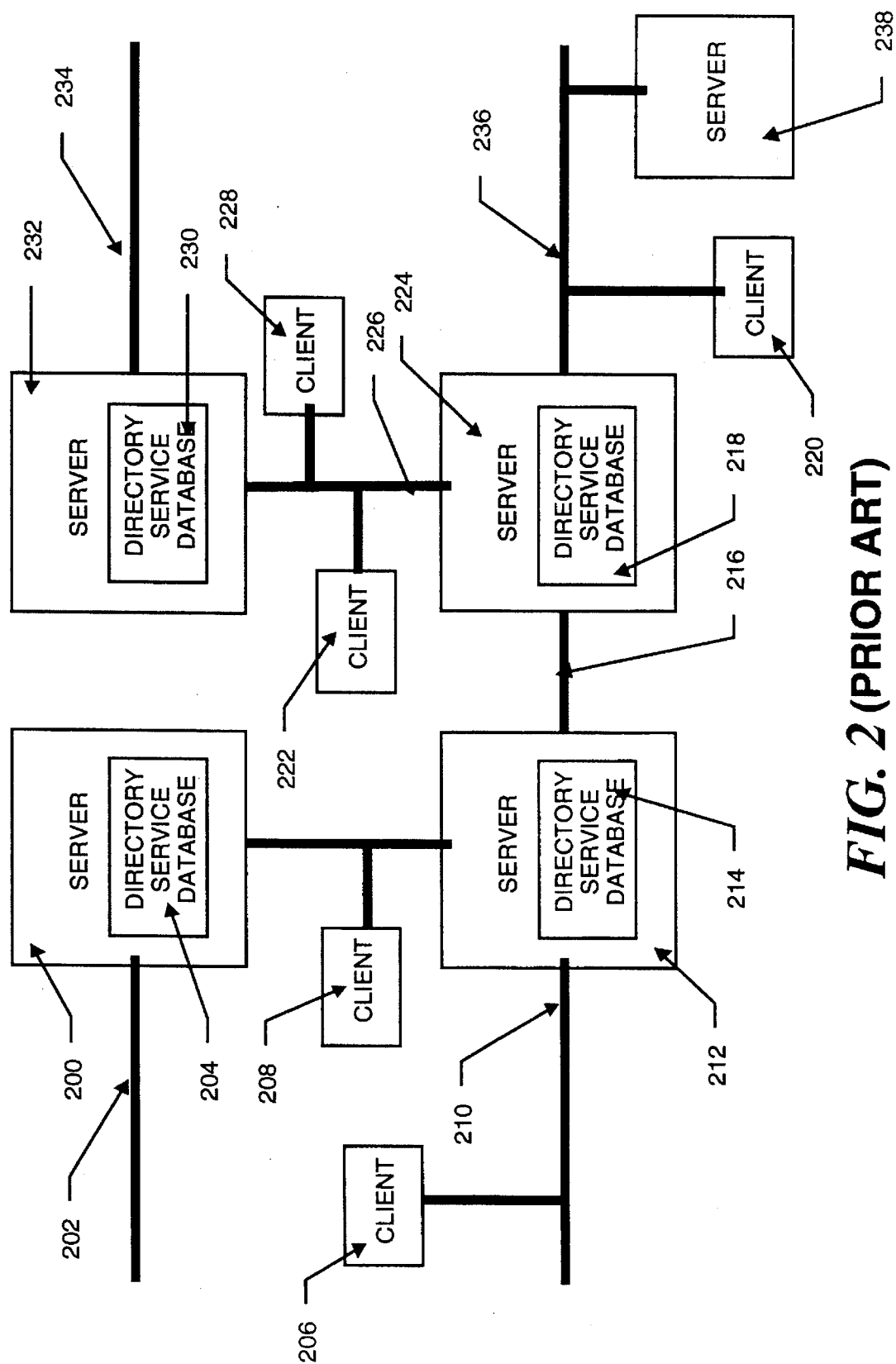
FIG. 2 is a block schematic diagram of a prior art client server network which incorporates a distributed directory server.
Figure 4:
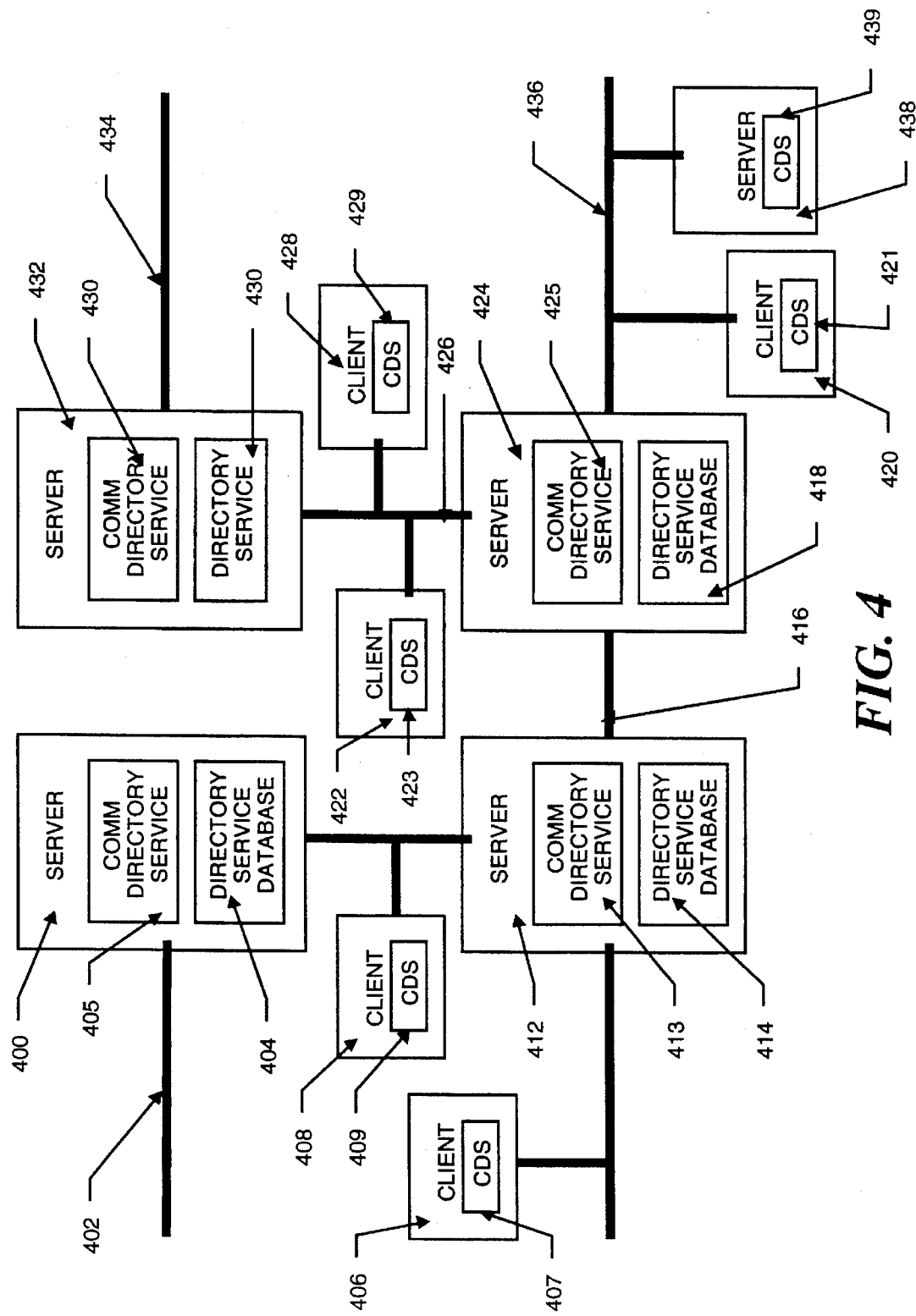
FIG. 4 is a block schematic diagram of a client server network which incorporates the inventive communications directory service.

FIG. 4 shows a schematic overview of the illustrative client-server network illustrated in FIGS. 1 and 2 which has now been provided with the inventive communications directory service which is the subject of the present invention. A comparison of FIGS. 2 and 4 indicates that, although the general network configuration is the same for both networks, when the inventive communications directory service is used as shown in FIG. 4, all of the nodes now include a communications directory service (CDS) module. In particular, server nodes 400, 412, 424, 432 and 438 now include the inventive communications directory service modules 405, 413, 425, 430 and 439, respectively. In addition, any or all server nodes may also include a conventional directory service 404, 414, 418 and 430, respectively. These conventional directory services will be referred to as physical directory services hereinafter to distinguish then from the communications directory service.

In addition to the server nodes, each of the client nodes 406, 408, 420, 422 and 428 (CDS 407, 409, 421,423 and 429, respectively) also includes a communications directory service. As will hereinafter be explained in detail, in enterprise networks such as that shown in FIG. 4, information to be sent from one node to another is generally divided into discrete messages or "packets" and the packets are transmitted between nodes in accordance with a predefined "protocol". In this context a "protocol" consists of a set of rules or procedures defining how the separate nodes are supposed to interact with each other.

In order to reduce design complexity, most networks are organized as a series of "layers" or "levels" so that information passing from one node to another is transmitted from layer to layer. Within each layer, predetermined services or operations are performed and the layers communicate with each other by means of predefined protocols. The purpose for the layered design is to allow a given layer to offer selected services to other layers by means of a standardized interface while shielding those layers from the details of actual implementation within the layer. As will hereinafter explained in detail, both the client and server nodes cooperate with the communications directory service modules in order to structure the network layers which, in turn, control the type and parameters of the connections between client and servers in accordance with the type of service being offered.

In an attempt to standardize network architectures (the overall name for the sets of layers and protocols used within a network), a generalized model has been proposed by the International Standards Organization (ISO) as a first step towards international standardization of the various protocols now in use. The model is called the open systems interconnection (OSI) reference model because it deals with the interconnection of systems that are "open" for communication with other systems. The proposed OSI model has seven layers which are termed (in the order which they interface with each other) the "physical", "data link", "network", "transport", "session", "presentation" and "application" layers. The purpose of the OSI model is to attempt to standardize the processes conducted within each layer.

In accordance with the OSI model, the processes carried out in the physical layer are concerned with the transmission of raw data bits over a communication channel. The processes carried out in the data link layer manipulate the raw data bit stream and transform it into a data stream that appears free of transmission errors. The latter task is accomplished by breaking the transmitted data into data frames and transmitting the frames sequentially accompanied with error correcting mechanisms for detecting or correcting errors.

The network layer processes determine how data packets are routed from the data source to the data destination by selecting one of many alternative paths through the network. The function of the transport layer processes is to accept a data stream from a session layer, split it up into smaller units (if necessary), pass these smaller units to the network layer, and to provide appropriate mechanisms to ensure that the units all arrive correctly at the destination, with no sequencing errors, duplicates or missing data.

The session layer processes allow users on different machines to establish "sessions" or "dialogues" between themselves. A session allows ordinary data transport between the communicating nodes, but also provides enhanced services in some applications, such as dialogue control, token management and synchronization. The presentation layer performs certain common functions that are requested sufficiently often to warrant finding a general solution for them, for example, encoding data into a standard format, performing encryption and decryption and other functions. Finally, the application protocol layer contains a variety of protocols that are commonly needed, such as database access, file transfer, etc.

Figure 5:
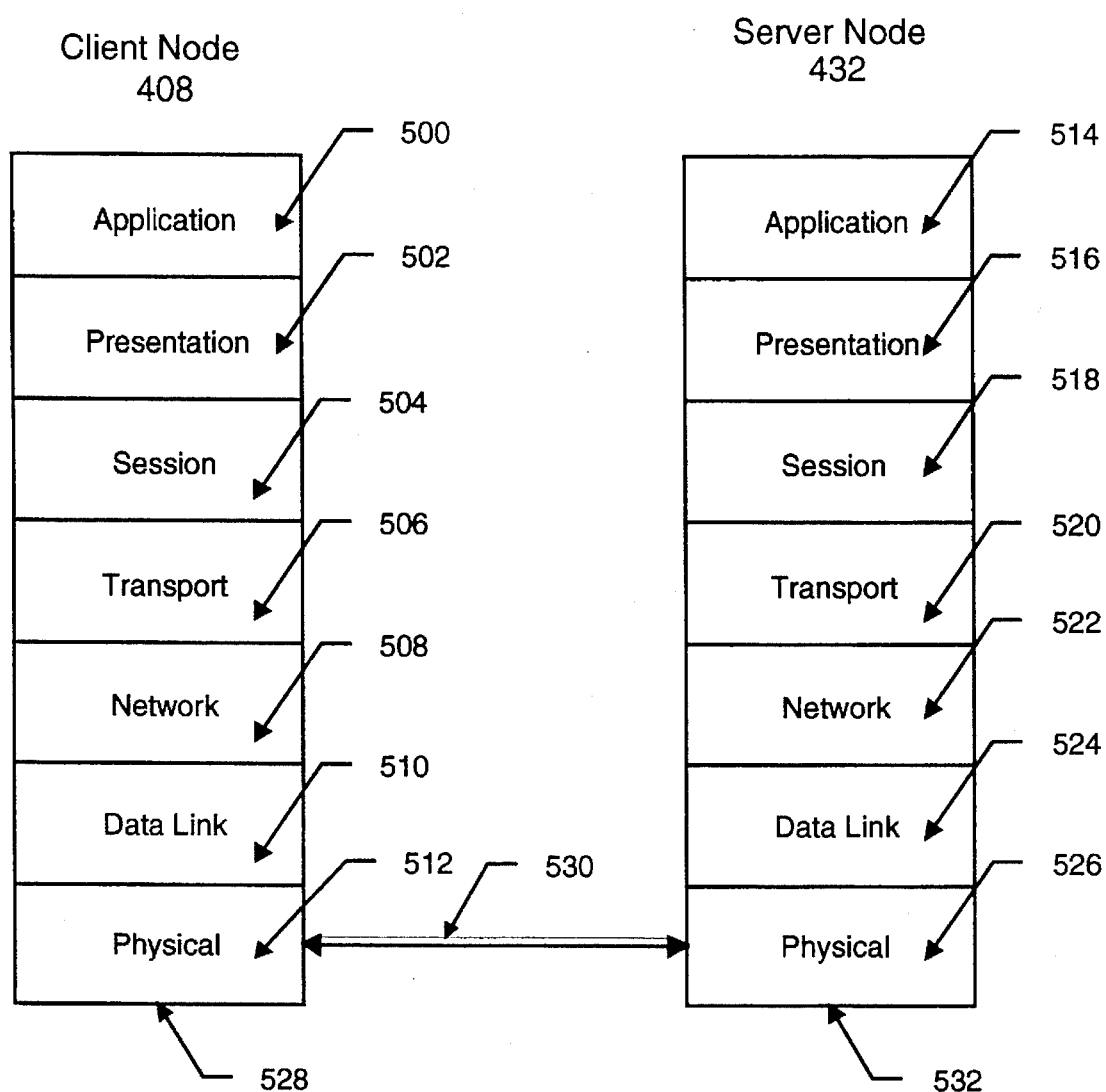
FIG. 5 is a detailed block schematic diagram of a prior art protocol stack used to transmit data between two nodes structure in accordance with the International Standards Organization seven layer model.

For example, FIG. 5 is a diagram of a prior art protocol stack used to connect two nodes in accordance with the OSI standard seven-layer architecture. In accordance with the OSI standard, each protocol stack for a node consists of seven layers. For example, stack 528 for Client node 408 comprises an application layer 500, a presentation layer 502, a session layer 504, a transport layer 506, a network layer 508, a data link layer 510 and a physical layer 512. The operation and the purpose of each of these layers has been previously discussed. Similarly, stack 532 for Server node 432 consists of layers 514–526. Although the actual data communication occurs between the two physical layers 512 and 526 over a data link 530, when the stack is arranged as shown in FIG. 5, each layer can be thought of as communicating with its "peer" which is a layer at the same level as a given layer. For example, the application layers 500 and 514 can be thought of as communicating directly even though information passes through all of the layers 502–512, across data link 530 and back through the layers 516–526. Similarly presentation layers 502 and 516 can communicate peer-to-peer.

The protocol stacks such as those shown in FIG. 5 are typically implemented using a plurality of data buffers. Each data buffer constitutes a protocol layer in which processing is done. After processing is complete in a layer the data may be transferred to another buffer for further processing in accordance with another layer.

In accordance with one aspect of the invention, the protocol stacks which control peer-to-peer communications in the network are configured by stack definitions stored in the communications directory service, these stack definitions are associated with each service type available on the network so that the protocol stacks can be dynamically configured in response to service requests from the application programs.

Figure 6:
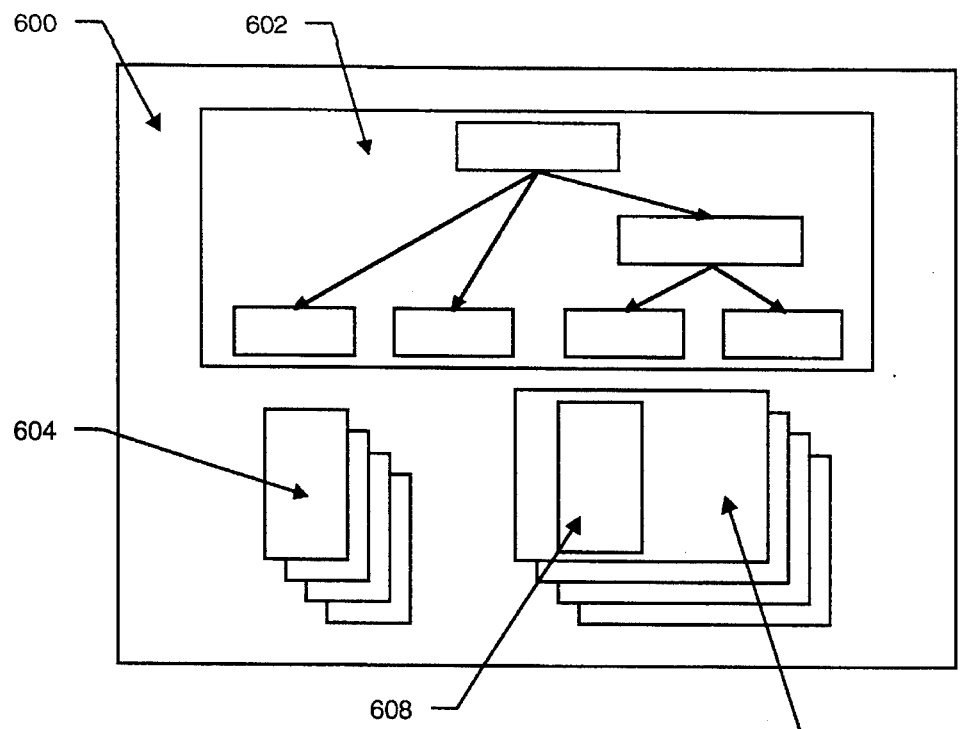
FIG. 6 is a block schematic diagram of the major components of the communications directory service.

A more detailed diagram of a communications directory service module is shown in detail in FIG. 6; the module includes three major components: a hierarchical directory tree 602 which allows each of the physical directory services and other services provided by the network to be located by means of a conventional tree searching techniques; a set of stack definition objects 604 which are used to program the dynamically reconfigurable stacks that allow a client to request data from a remote server over a prespecified communication link and a set of "service objects" 606. Each service object is associated with one service available on the network and contains the network address or exchange address at which the service is available and a reference 608 to one or more of the stack definition objects 604. As will hereinafter be explained in detail, a reference to one of these service objects is obtained by an application program desiring to access the corresponding service. The information in the object identified by this reference is then sent to the reconfigurable stack in order to set up the communication path.

The stack definitions 604 each consist of a set of layer definitions that specify the processing carried out in each layer and the interactions between the layers. The stack definitions are defined at the time that the communications links are installed on the network system. In particular a stack definition is provided for each different type of communication link on the system.

The communications directory service 600 has a number of other features which make its operation particularly convenient for users on the network. In particular, the directory service stores information regarding the available services and directory services in the directory tree as a series of objects. In addition, the stored libraries in the communications directory service contain objects and, thus, both application programs and service programs can communicate directly with the communications directory service by means of objects. Since the communications directory service is present on each of the nodes, a client need not connect with any directory service server before using the directory service, instead the objects themselves provide the interface.

Further, the use of predefined objects, such as the service objects 606, provides a simple method to allow an application program to open communications with a desired service. The service objects can be sent directly to the networking service in order to open a communications path without requiring the application program to concern itself with the details of the actual path construction. In addition, because any existing physical directory services are encapsulated in the node objects of the directory tree 602, the physical directory services are completely hidden from the client application allowing the client application to interact with the inventive communications directory service with a consistent protocol and feature set.

Figure 7:
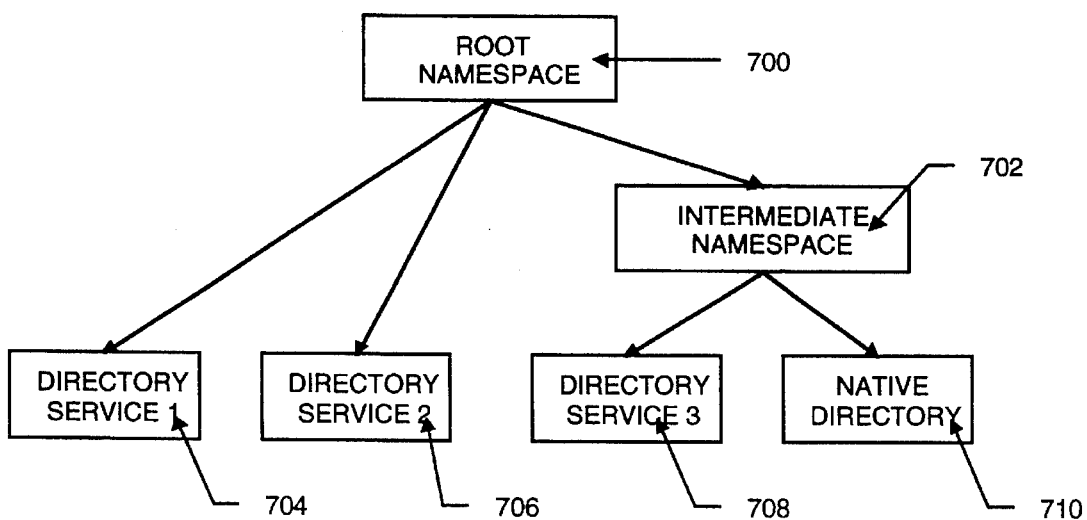
FIG. 7 is a schematic diagram of an illustrative directory tree set up which allows browsing over various directory services and other network services.

A more detailed diagram of the directory tree 602 found in the communications directory service is shown in FIG. 7.

As will hereinafter be explained, the directory tree can be traversed by means of simple search commands and full browsing capabilities are provided by using wild cards and placeholders. The directory tree is designed so that objects are returned as the result of searches with the type of object which is returned being determined by the implementation of the portion of the directory which returns the object. Examples of objects which can be returned from a directory tree search are references to the service objects 606 shown in FIG. 6 which contain information used to connect to remote service; principle objects which contain security and authentication information about users; "business cards'" which contain collections of information about users and other classes which may be added to the directory tree by program developers.

The directory tree is organized as a single hierarchical tree such as that shown in FIG. 7. It should be noted that the tree configuration shown in FIG. 7 is for an illustrative purposes only and an actual tree configuration can differ significantly from the illustrated configuration without departing from the scope and principles of the present invention. Each of the nodes in the tree is formed by a "namespace" object. A namespace object can refer to other namespace objects or can refer directly to services or other physical directory services. The ultimate root of the directory tree is the root namespace object 700; the root namespace object 700 and the other namespace objects which form the nodes of the tree are inserted into a conventional tree structure which can be traversed to find the node members.

Each node object, such as root namespace object 700, includes methods which facilitate directory searches. In particular, these methods may include a search method which returns an iterator over all entries in the directory, a method which returns entries to which the namespace refers and a method which returns entries that match a given property expression. Additional methods may be provided to obtain the root namespace from lower level directory node.

In the tree directory shown in FIG. 7, the ultimate nodes or "leaf" nodes are the physical directory services and the other available network services. As these leaf nodes are also namespace objects, they may include methods which return the associated directory protocol and methods which can interact with the physical directory to search or browse the directory. Since each of the leaf nodes contains methods which are written specifically for the associated service, the methods deal with the protocol issues involved with the associated service allowing the user to interface with the communications directory service in a consistent manner no matter what directory service is involved.

For example, in FIG. 7, three nodes 704, 706 and 708 are shown which interact with three separate physical directory services. A fourth node, 710, is also provided, which node is called a "native" namespace node. This latter node contains a reference to each of the services that are provided by the network. As will hereinafter be explained, in order to make each service available to the users, it is "registered" in the native namespace 710. "Registration" in the namespace means to insert a reference to the service into the directory where it can found by someone traversing the directory. Essentially, registration consists of streaming the associated service object into the native namespace where it can be discovered by queries.

In addition, to registering a service, it is also possible to "publish" a service in the directory or in the physical directory services resident in the leaf nodes. Publication differs from registration in that publication involves inserting a limited set of information about the service into a directory node. This limited set of information may, for example, consist of the service name, type of service and a connection address. In a preferred form of the invention, the native namespace handles publications—when a service entity is registered with the native namespace, the native name space determines in which other namespaces the entity should be published and directs the publication accordingly.

In order to provide full branching capabilities, intermediate namespaces, such as name space 702 may be inserted between the root namespace 700 and the leaf nodes 704–710. The intermediate namespace refers to other namespaces.

As previously mentioned, the inventive communications directory service interacts with both service programs and application programs to transparently set up the necessary communication links between the client and server. This interaction involves the creation of service objects in the communications directory service by the service providers and the configuration of the protocol stacks in the server nodes. A client desiring to access a service retrieves the associated service object and uses it to configure the protocol stacks in the client node to set up the communication link.

Figure 8:
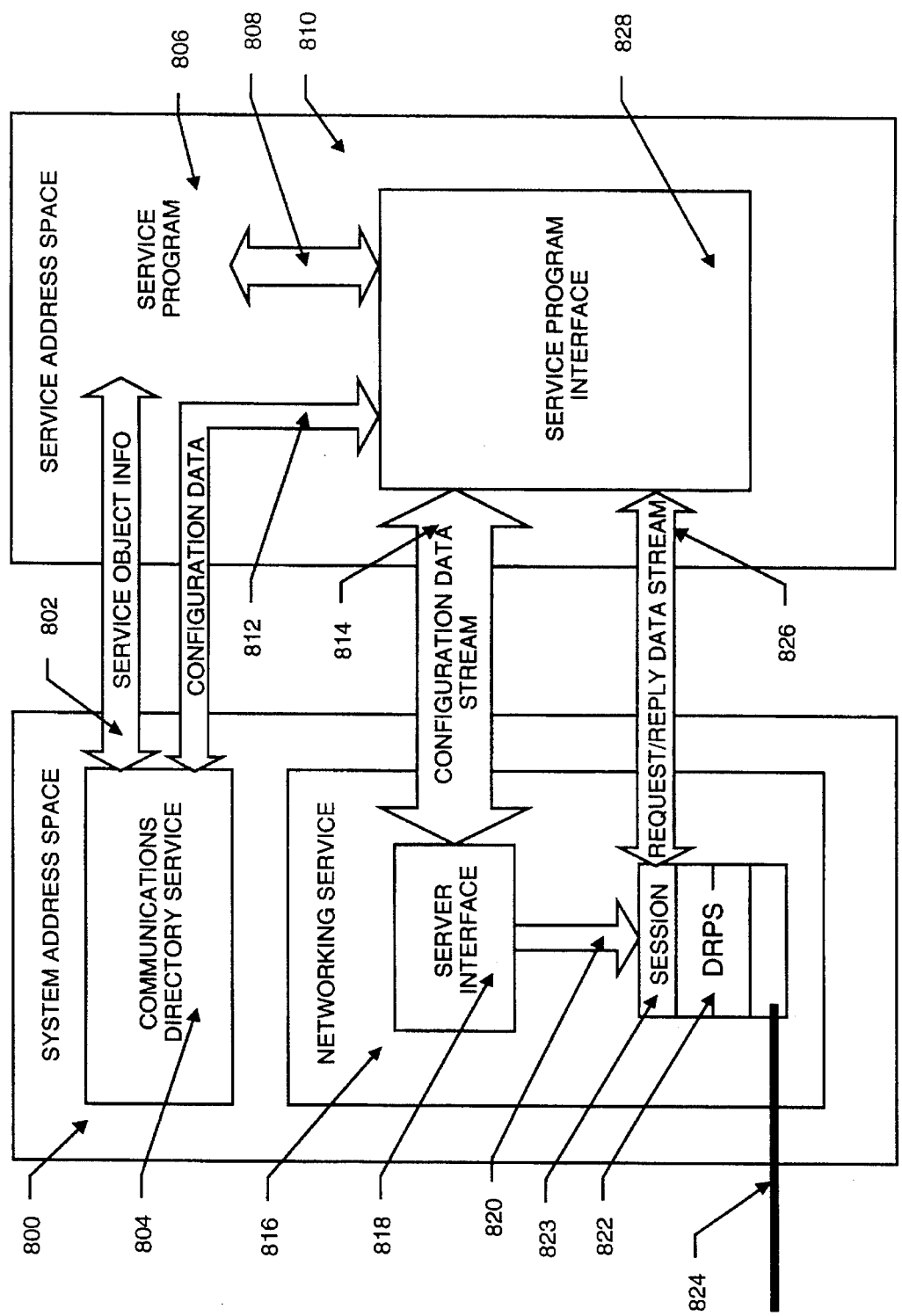
FIG. 8 is a block schematic diagram of the main components of a server node illustrating how a service program interacts with the communications directory service.
Figure 9:
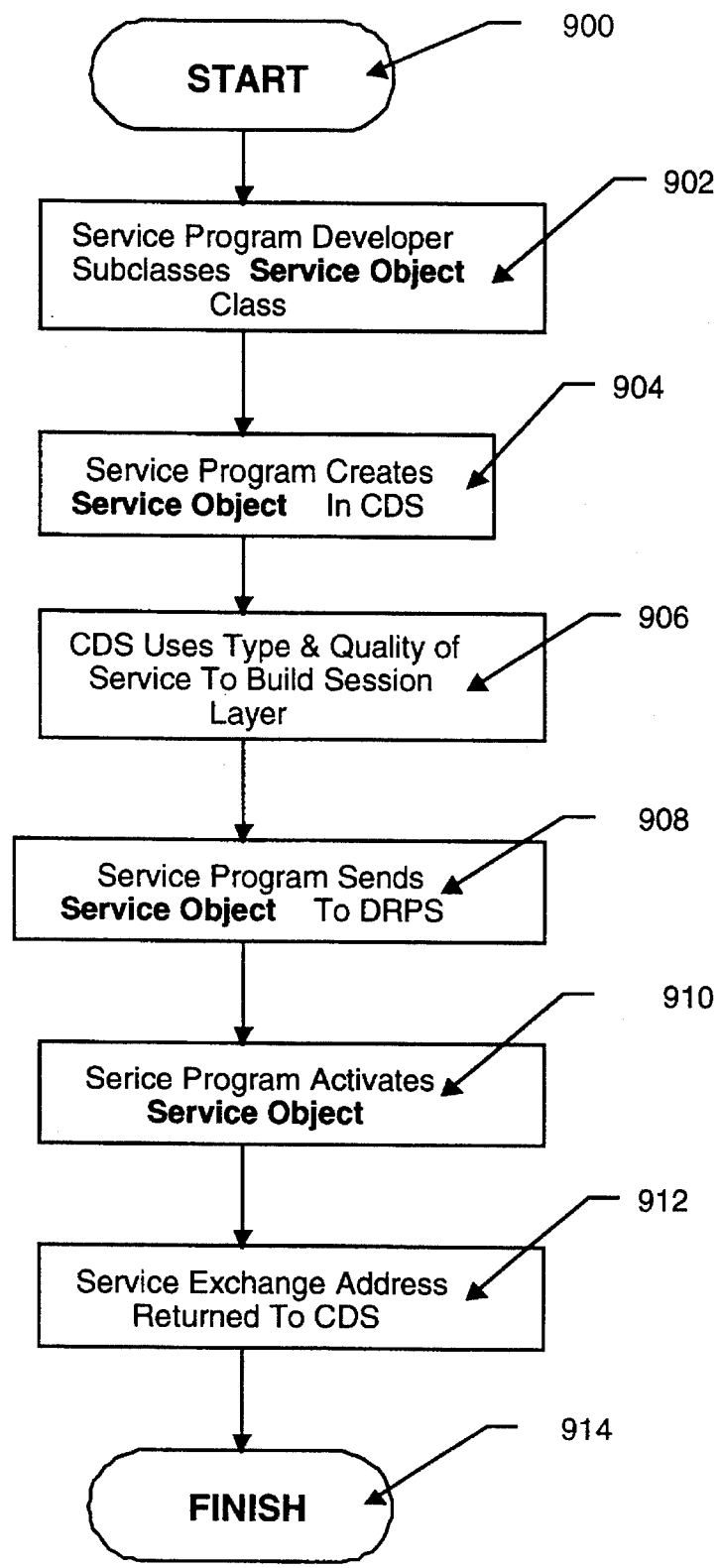
FIG. 9 is a simplified flowchart of the steps involved in making a new service available on the network.
Figure 10:
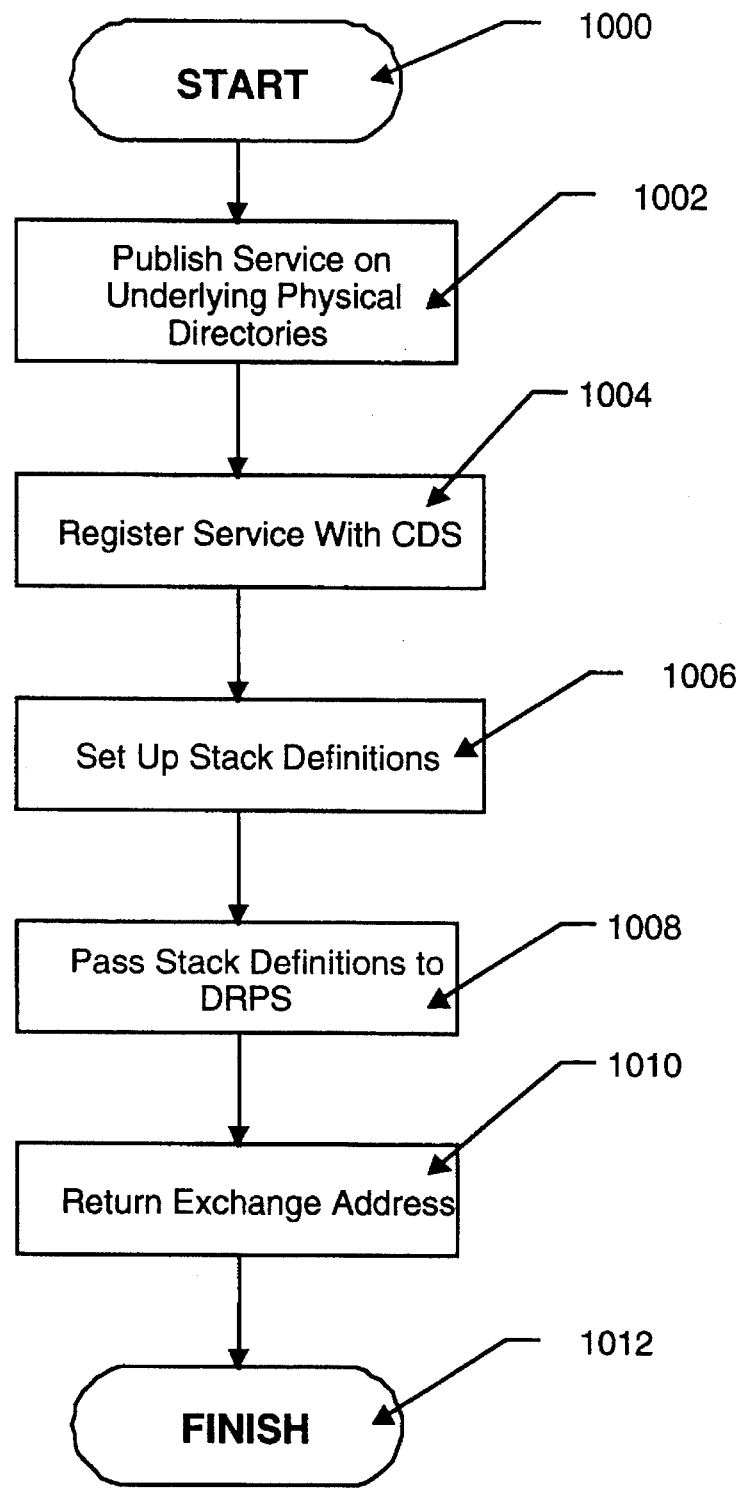
FIG. 10 is an expanded flowchart of the steps carried out by the service program in order to activate a service object.

FIGS. 8–10 describe the operations performed by a service program operating in a server node in order to make a new service available on the network for use by application programs running in the client nodes. FIG. 8 is a schematic block diagram of the portions of the server node programs that are involved in the creation and activation of a new service. FIG. 9 is an illustrative flow chart which describes the interaction between the service program, the inventive communications directory service and the node networking services in order to establish the new service and to configure the networking service to operate over an appropriate communication link. FIG. 10 is a more detailed block diagram illustrating the activation of the new service by activating the associated service object.

More particularly, FIG. 8 illustrates the basic configuration of a server node in providing a service to a remote client. The server node is arranged with a common area, or system address space, 800 which address space would include operating system programs and various shared libraries that are used by the service applications running on the system. In particular, the system address space 800 includes the communications directory service 804 and the networking service programs and libraries 816.

Also in the server node is the service program which runs in its own address space 810. As will be hereinafter explained, the service program 806 interacts with the communications directory service 804 to create a service object which then resides in the communications directory service 804. This service object is distributed to all of the other nodes in this system and, thus, is available on a local basis to all of the clients on the network. Because the service object includes the appropriate stack definitions for configuring the networking service 816, the application program together with the communications directory service can set up the communications path using the previously stored definitions without involving a client application program in the construction details.

Referring to FIG. 9, the creation of a new service begins in step 900 and proceeds to step 902. In step 902, the developer of the service program enables the creation of a new service object containing configuration parameters which are appropriate to the new service. This may be done by subclassing the service object classes located in the directory service. In particular, in order to create a new service object class, the service program developer specifies a unique name for the service, the type of service and, optionally, various communications link types which can be used to access the service. In accordance with normal object-oriented programming language operation, this subclassing information is included in the service program code during compilation. Therefore, when the service program 806 is installed in the service program address space 810 in the appropriate server node, the constructor of the service object subclass can be called to construct a service object in the communications directory service 804 as illustrated in step 904 (FIG. 9). During the process of calling the constructor, the type and quality of service information is passed to the communications directory service as schematically indicated by arrow 802

As previously mentioned, the communications directory service 804 includes a set of stack definitions in shared libraries. These stacks definitions are created when the communications links are defined and are associated with a particular transport mechanism. The stack definitions each consist of a set of layer definitions. The layer definitions control the processing of the data in each layer and the interactions between layers. Each stack definition completely defines the stack from the transport layer through the physical layer (these layers are described in detail above).

In the process of creating a new service object, the communications directory service 804 uses the type and quality of service information provided by the service program to construct a session layer and include appropriate references to the stored communications stack definitions as set forth in step 906. If more than one communication link can be used to access the new service, appropriate stack definitions are referenced in the new service object and the session layer is constructed in order to select one of the communication links based on various criteria, such as the quality of service desired and the availability of the communication link.

Thus, the newly-created service object contains a session layer and the appropriate stack definitions which define the stack from the transport layer to the physical layer. The service object is stored in the communications directory service. However, at this time, no service address or exchange address is provided in the service object because the service object, although created, is not active. Thus, a service object can be created any point when the service program is installed in the server node, but the service program however does not become activated until further steps are taken as described below.

More particularly, in order to activate the new service, the service program instructs the communications directory service 804 to send the stored service object to the dynamically reconfigurable protocol stack (DRPS) 822 in networking service 816 as described in step 908. The manner in which the service object is transferred to the DRPS is illustrated in FIG. 8. More particularly, the service program 806 first creates a service program interface 828 in its own address space 810. The communication between the service program and the service program interface is schematically indicated by arrow 808. The service program interface 828, in turn, creates a configuration data stream 814 which can stream data to a server interface 818 which is permanently available and located in the networking service 816.

The service program 806 then retrieves the service object including the network configuration data. The configuration data passes from the communications directory service to the service program interface 828 as indicated by arrow 812. The configuration data is then streamed to the system address space 800 as indicated by arrow 814.

Next, as illustrated in step 910, the service program activates the service object which, in turn, causes the service exchange address to be returned to the communications directory service 804. A more detailed description of the activation sequence is illustrated in the flow chart shown in FIG. 10. More particularly, the activation sequence starts in step 1000 and proceeds to step 1002. In step 1002, the communications directory service 804 makes the service available by publishing the service on any underlying physical directory services if this is appropriate. This publication consists of registering the name of the service and, in some cases, the service address in the underlying directory services.

The routine next proceeds to step 1004 in which the service is registered with the communications directory service. As previously mentioned, such registration involves streaming the service object into the native namespace node of the communications directory service. At this point, a reference to the service is added to the CDS directory tree so that the service can be located by user traversing the tree.

Next, in step 1006, the stack definition references which have been passed to the server interface 818 in networking service 816 by the service program 806 are used to set up the stack definitions that will be used to reconfigure the DRPS 822. In step 1008, the created stack definitions are passed to the DRPS (this operation is shown schematically by arrow 820). At this time the information in the service object is also used to set up the session layer 823.

In step 1010, the exchange address, or the network address, of the session layer 823 in the DRPS 822 is returned to the communications directory service 804. In particular, the networking service 816 obtains the session layer address from the DRPS 822 when the session layer is set up. This address is returned, via the service interface 818, configuration data stream 814, to the service program interface 828. Finally, the exchange address is returned, via the data stream 812, to the communications directory service 804. The exchange address, as previously mentioned, is stored in the associated service object located in the communications directory service 804 so that it can later be retrieved by a client program. At this point, activation is complete and the activation routine shown in FIG. 10 ends in step 1012. In step 912, the exchange address is returned to the communications directory service and the service activation routine ends in step 914.

A separate data stream is also set up by the service program at this time so that, at a subsequent time, when a client node requests service from the server node, the incoming service requests can be received. In particular, service request data arriving over the physical communication link 824 is passed through the configured DRPS 822 via a separate request data stream 826 which links the session layer 823 to the service program interface 828. The service program interface 828, in turn, forwards the request, via data stream 808, to the service program 806. Reply information is returned by service program 806, via data stream 808, service program interface 828, request data stream 826, DRPS 822, and physical communication link 824 to the client node.

After a new service has been added to the local communication directory service, the copies on the other nodes must be updated. This updating is carried out in a conventional fashion. For example, it is possible to periodically distribute copies on removable disks to all nodes. However, a more preferred method of distributing copies of the communications directory service would be for the local node which received the update to broadcast the update information to all other nodes. In order to accomplish this broadcast, the broadcast message includes a special header which causes all of the protocol stacks to be set to a predetermined default protocol. In this manner the broadcast message can be received at all nodes.

Figure 11:
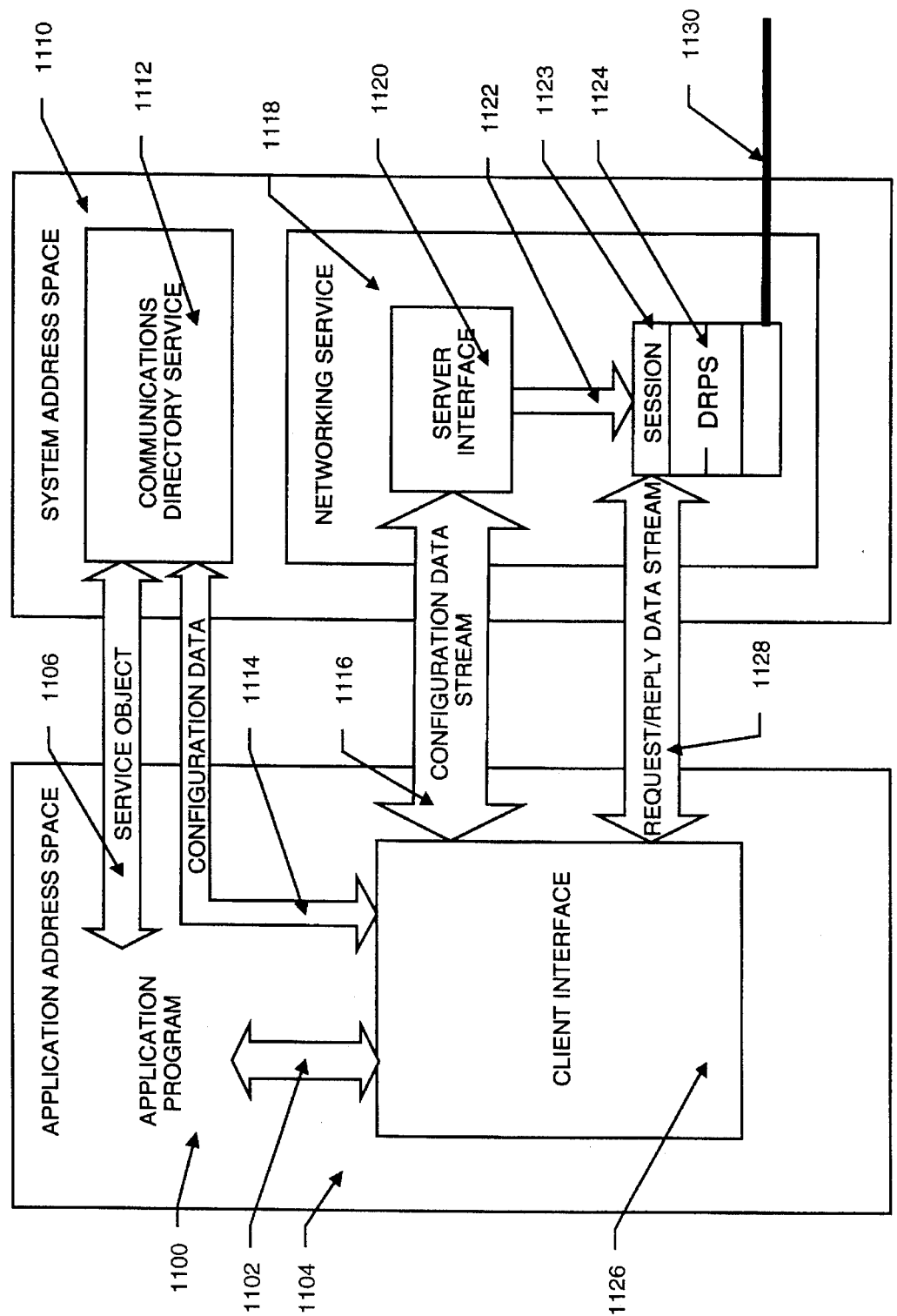
FIG. 11 is a block schematic diagram of the main components of a client node illustrating how an application program interacts with the communications directory service to access a service.
Figure 12:
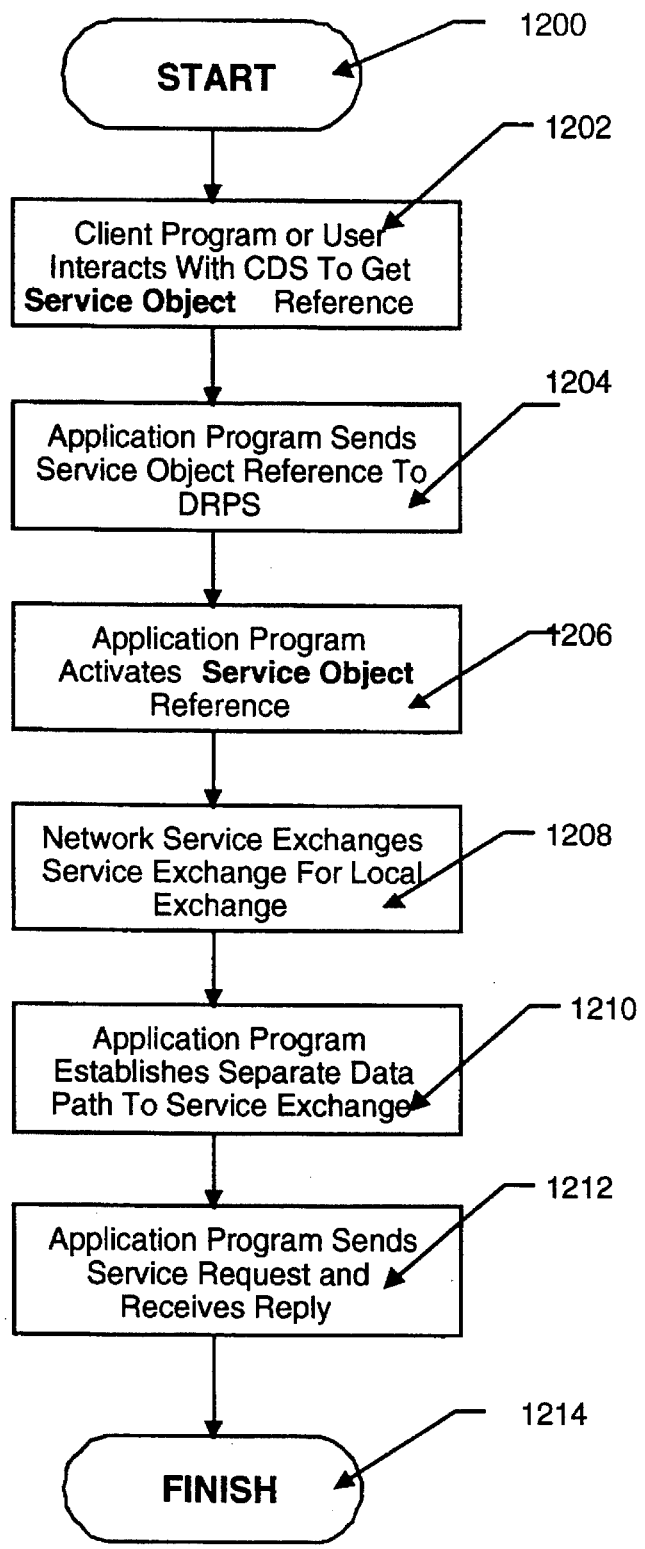
FIG. 12 is a simplified flowchart of the steps involved in accessing a service available on the network.
Figure 13:
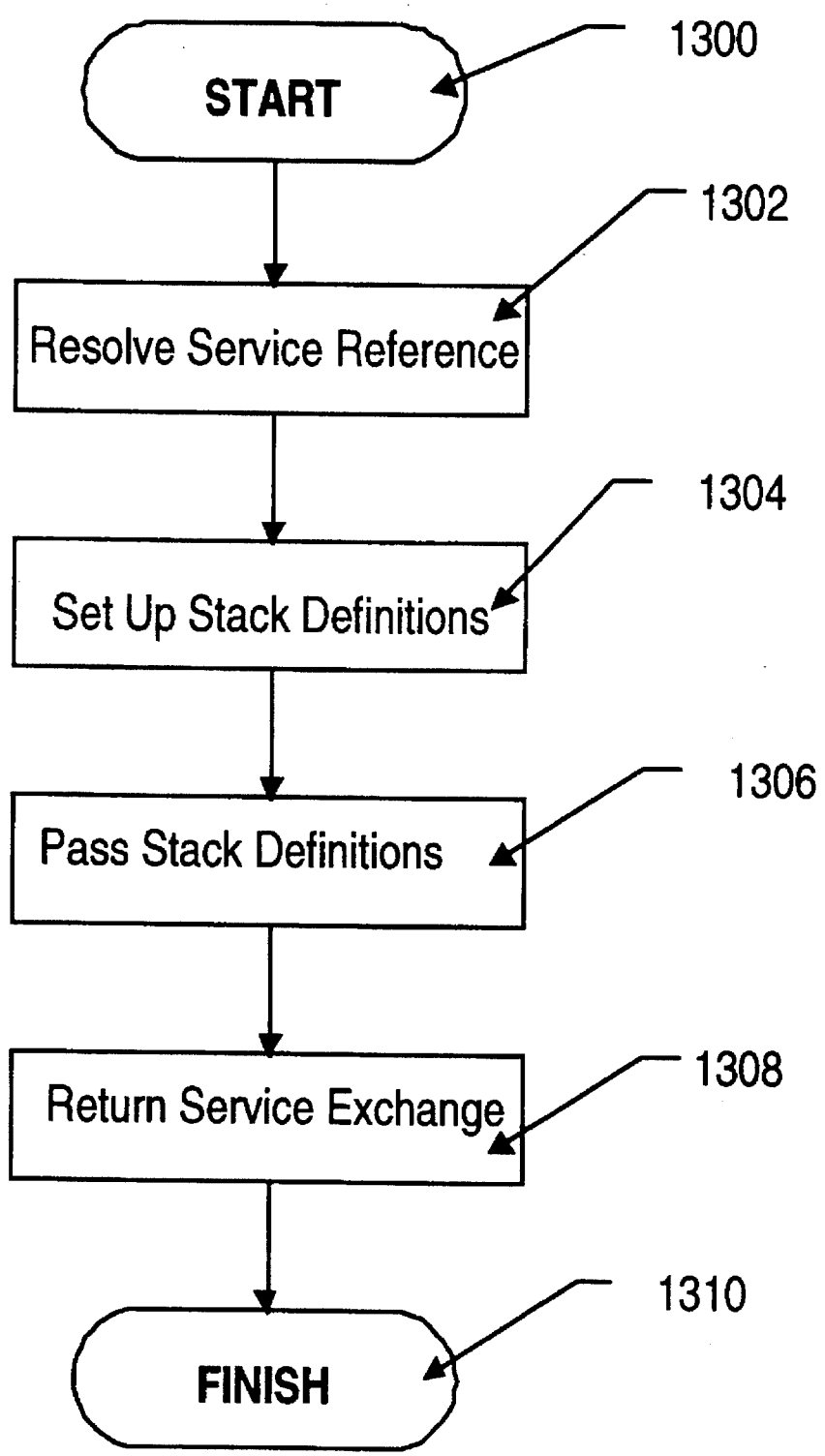
FIG. 13 is an expanded flowchart of the steps carried out by the service program in order to activate a service object.

FIGS. 11 through 13 illustrate the steps involved when a client application coordinates with the communications directory service to access a remote service. In particular, FIG. 11 illustrates the appropriate sections of the client node which are involved in accessing a remote service. As in the server node, the client node includes a system address space 1110 which, in turn, contains the inventive communications directory service 1112 and a networking service 1118. The application program 1100 runs in its own application address space 1104. The interactions of the application program 1100, the directory service 1112 and the networking service 1118 are described in more detail in the flow charts set forth in FIGS. 12 and 13.

More particularly, the client service access routine starts in step 1200 and proceeds to step 1202. As indicated in step 1202, the client interacts with the communications directory service to get a reference to one of the service objects stored in the communications directory service. This interaction is shown schematically by arrow 1106 on FIG. 11. As previously mentioned, this interaction may involve a user directly if the user searches over the directory tree located in the communications directory service 1112. Alternatively, this interaction may involve an intervening application program which cooperates with the communications directory service to select a service in a visual manner, such as, by dragging a document icon onto a service icon.

In any case, in accordance with step 1204, a reference to the service object identified by the communications directory service 1112 is returned to the application program 1100 as shown schematically by arrow 1108. The application program, in turn, creates a client interface object 1126 in preparation for sending the configuration data to the network service 1118. The service object reference is passed by the communications directory service 1112, via a configuration data stream 1114, to the client interface 1126. From the client interface 1126 the configuration data is streamed over configuration data stream 1116 to a server interface object 1120 located in the networking service 1118. The service interface object 1120 is created when the networking service 1118 is created during system boot up and is permanently resident in the networking service.

In accordance with step 1206, application program 1100 then activates the service object reference. FIG. 13 indicates, in more detail, the steps involved in activating the service object reference. More particularly, the activation routine starts in step 1300 and proceeds to step 1302. In step 1302, the service object reference is resolved in any of the underlying physical directory services, if appropriate. This resolution is performed by using the service name located in the service object to search over the underlying directory services and to obtain the network address. Alternatively, if the service reference is registered in the native namespace of the communications directory service 1112, then the service address or the service exchange can be obtained directly from the service object reference.

In step 1304, the stack definitions contained in the service object are used by the server interface 1120 and the networking service 1118 to set up protocol stack layers for configuring the DRPS 1124. Next, in step 1306, the created stack definitions are passed to the DRPS as indicated by arrow 1122. These stack definitions then set up DRPS 1124 and configure the communication link in preparation for sending request and reply data between the application program 1100 and the remote service (not shown in FIG. 11).

Next, in step 1308, the address of the session layer 1123 in the DRPS 1124 is returned to the server interface 1120. The activation routine then finishes in step 1310. Returning to step 1208 of FIG. 12, the server interface 1120 exchanges the address of the session layer 1123 for the remote service exchange obtained from the service object reference and returns the remote service exchange (as indicated in step 1208), via configuration data stream 1116, client interface 1126 and data path 1102 to the application program 1100. Thus, when the application program communicates with the remote service, it uses the remote service address passed through the communications directory service to the networking service.

As set forth in step 1210, a separate data path is set up to send service requests from application program 1100 to the remote service. This separate data path comprises data path 1102, client interface 1126 and the session layer 1123 of the DRPS 1124. In accordance with step 1212, the request information then sent out over physical communication link 1130 to the remote service location. Reply information returns via DRPS 1124, data stream 1128, client interface 1126 and data path 1102 to the application program 1100. The service request routine then finishes in step 1214.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

Having thus described our invention, what we claim as new, and desire to secure by Letters Patent is:

1. A method for activating a new service in a client-server network system having a plurality of communications links, a server node with a memory therein connectable to each of the plurality of communications links by a multilayer dynamically reconfigurable network protocol stack, a service program in the server node memory, a communications directory service program in the server node memory and a networking service program in the server node memory, the method comprising the steps of:

(a) storing a plurality of stack definitions in the server node memory wherein each of the plurality of stack definitions corresponds to one of the plurality of communication links and the each stack definition includes a set of layer definitions for controlling the processing of data in each layer of the multilayer network protocol stack from a transport layer through a physical layer and the interactions between layers;

(b) storing in the server node memory service object class information including information for defining a data structure for holding a reference to one of the plurality of stack definitions and logic which is responsive to type and quality of service information for inserting a reference to at least one of the plurality of stack definitions into the data structure and for constructing a session layer of the multilayer network protocol stack;

(c) creating a service object from the service object class information by passing in a type of service to the communications directory service and executing the logic to insert a reference to a stack definition and construct a session layer;

(d) sending the service object to the networking service program; and (e) using the reference to the stack definition and the session layer in the service object to reconfigure the multilayer network protocol stack.

2. The method of claim 1 wherein step (e) comprises the steps of:

(e1) returning an exchange address of the session layer in the multilayer network protocol stack to the communications directory service program; and (e2) storing the exchange address in the service object.

3. The method of claim 1 wherein the communications directory service program has a directory true and wherein the method further comprises the step of:

(f) registering the service object in the directory tree.

4. The method of claim 1 wherein the new service is accessible on a plurality of communications links and step (c) comprises the steps of:

(c1) executing the logic in the service object class information to insert references to a stack definition for each of the plurality of communications links into the data structure; and (c2) executing the logic in the service object class information to construct a session layer including logic for selecting one of the stack definition references in the data structure based on at least one of (a) the quality of service desired and (b) the availability of the plurality of communication links.

5. The method of claim 4 wherein step (d) comprises the step of:

(d1) sending the service object to the networking service program via the service program.

6. The method of claim 5 wherein step (d1) comprises the steps of:

(d1a) creating a service program interface in the server node memory;

(d1b) creating a configuration data stream from the service program interface to the networking service program; and (d1c) streaming the service object from the communication directory service program via the service program interface and the configuration data stream to the networking service program to configure the multilayer network protocol stack.

7. The method of claim 6 wherein step (e) comprises the step of:

(e1) returning an exchange address of the session layer in the multilayer network protocol stack to the communications directory service program via the configuration data stream and the service program interface.

8. The method of claim 1 further comprising the step of:

(g) sending the service object to communications directory programs in other nodes on the client-server network system.

9. Apparatus for activating a new service in a client-server network system having a plurality of communications links, a server node with a memory therein connectable to each of the plurality of communications links by a multilayer dynamically reconfigurable network protocol stack, a service program in the server node memory, a communications directory service program in the server node memory and a networking service program in the server node memory, the apparatus comprising:

(a) means for storing a plurality of stack definitions in the server node memory wherein each of the plurality of stack definitions corresponds to one of the plurality of communication links and the each stack definition includes a set of layer definitions for controlling the processing of data in each layer of the multilayer network protocol stack from a transport layer through a physical layer and the interactions between layers;

(b) means for storing in the server node memory service object class information including information for defining a data structure for holding a reference to one of the plurality of stack definitions and logic which is responsive to type and quality of service information for inserting a reference to at least one of the plurality of stack definitions into the data structure and for constructing a session layer of the multilayer network protocol stack;

(c) means controlled by the service program for creating a service object from the service object class information by passing in a type of service to the communications directory service and executing the logic to insert a reference to a stack definition and construct a session layer;

(d) means responsive to an activation request from the service program for sending the service object to the networking service program; and (e) means in the networking service program and responsive to the service object for reconfiguring the multilayer network protocol stack using the reference to the stack definition and the session layer in the service object.

10. The apparatus of claim 9 wherein the reconfiguring means comprises:

means responsive to the configuration of the session layer in the multilayer network protocol stack for returning an exchange address of the session layer in the multilayer network protocol stack to the communications directory service program; and means in the communications directory service and responsive to the exchange address for storing the exchange address in the service object.

11. The apparatus of claim 9 wherein the communications directory service program has a directory tree and wherein the apparatus further comprises means for registering the service object in the directory tree.

12. The apparatus of claim 9 wherein the new service is accessible on a plurality of communications links and wherein the service object creating means comprises:

means for executing the logic in the service object class information to insert references to a stack definition for each of the plurality of communications links into the data structure; and means for executing the logic in the service object class information to construct a session layer including logic for selecting one of the stack definition references in the data structure based on at least one of (a) the quality of service desired and (b) the availability of the plurality of communication links.

13. The apparatus of claim 9 wherein the sending means comprises first means for sending the service object to the networking service program via the service program.

14. The apparatus of claim 13 wherein the first sending means comprises:

means for creating a service program interface in the server node memory;

means for creating a configuration data stream from the service program interface to the networking service program; and means for streaming the service object from the communication directory service program via the service program interface and the configuration data stream to the networking service program to configure the multilayer network protocol stack.

15. The apparatus of claim 14 wherein the reconfiguring means comprises means for returning an exchange address of the session layer in the multilayer network protocol stack to the communications directory service program via the configuration data stream and the service program interface.

16. The apparatus of claim 9 further comprising means for sending the service object to communications directory programs in other nodes on the client-server network system.

17. A computer program product for activating a new service in a client-server network system having a plurality of communications links, a server node with a memory therein connectable to each of the plurality of communications links by a multilayer dynamically reconfigurable network protocol stack, a service program in the server node memory, a communications directory service program in the server node memory and a networking service program in the server node memory, the computer program product comprising a computer usable medium having computer readable program code including:

(a) means for storing a plurality of stack definitions in the server node memory wherein each of the plurality of stack definitions corresponds to one of the plurality of communication links and the each stack definition includes a set of layer definitions for controlling the processing of data in each layer of the multilayer network protocol stack from a transport layer through a physical layer and the interactions between layers;

(b) means for storing in the server node memory service object class information including information for defining a data structure for holding a reference to one of the plurality of stack definitions and logic which is responsive to type and quality of service information for inserting a reference to at least one of the plurality of stack definitions into the data structure and for constructing a session layer of the multilayer network protocol stack;

(c) means controlled by the service program for creating a service object in the server node memory from the service object class information by passing in a type of service to the communications directory service and executing the logic to insert a reference to a stack definition and construct a session layer;

(d) means responsive to an activation request from the service program for sending the service object to the networking service program; and (e) means in the networking service program and responsive to the service object for reconfiguring the multilayer network protocol stack using the reference to the stack definition and the session layer in the service object.

18. A method for activating a new service in a client-server network system having a plurality of communications links, a server node with a memory therein connectable to each of the plurality of communications links by a multilayer dynamically reconfigurable network protocol stack, a service program in a service program address space of the server node memory, a communications directory service program in a system address space of the server node memory and a networking service program in the system address space of the server node memory, the method comprising the steps of:

(a) storing a plurality of stack definitions in the system address space of the server node memory wherein each of the plurality of stack definitions corresponds to one of the plurality of communication links and the each stack definition includes a set of layer definitions for controlling the processing of data in each layer of the multilayer network protocol stack from a transport layer through a physical layer and the interactions between layers;

(b) storing in the system address space of the server node memory service object class information including information for defining a data structure for holding a reference to one of the plurality of stack definitions and logic which is responsive to type and quality of service information for inserting a reference to at least one of the plurality of stack definitions into the data structure and for constructing a session layer of the multilayer network protocol stack;

(c) creating a service object in the system address space from the service object class information by passing in a type of service to the communications directory service and executing the logic to insert a reference to a stack definition and construct a session layer;

(d) sending the service object to the networking service program; and (e) using the reference to the stack definition and the session layer in the service object to reconfigure the multilayer network protocol stack.

19. Apparatus for activating a new service in a client-server network system having a plurality of communications links, a server node with a memory therein connectable to each of the plurality of communications links by a multilayer dynamically reconfigurable network protocol stack, a service program in a service program address space of the server node memory, a communications directory service program in a system address space of the server node memory and a networking service program in a system address space of the server node memory, the apparatus comprising:

(a) means for storing a plurality of stack definitions in the system address space wherein each of the plurality of stack definitions corresponds to one of the plurality of communication links and the each stack definition includes a set of layer definitions for controlling the processing of data in each layer of the multilayer network protocol stack from a transport layer through a physical layer and the interactions between layers;

(b) means for storing in the system address space service object class information including information for defining a data structure for holding a reference to one of the plurality of stack definitions and logic which is responsive to type and quality of service information for inserting a reference to at least one of the plurality of stack definitions into the data structure and for constructing a session layer of the multilayer network protocol stack;

(c) means controlled by the service program for creating a service object in the system address space from the service object class information by passing in a type of service to the communications directory service and executing the logic to insert a reference to a stack definition and construct a session layer;

(d) means responsive to an activation request from the service program for sending the service object to the networking service program; and (e) means in the networking service program and responsive to the service object for reconfiguring the multilayer network protocol stack using the reference to the stack definition and the session layer in the service object.

* * * * *